(12) United States Patent
Steimer et al.

(10) Patent No.: US 7,443,698 B2
(45) Date of Patent: *Oct. 28, 2008

(54) CONVERTER CIRCUIT FOR SWITCHING OF A MULTIPLICITY OF SWITCHING VOLTAGE LEVELS

(75) Inventors: Peter Steimer, Ehrendingen (CH); Peter Barbosa, Dättwil (CH); Luc Meysenc, Saint Egrève (FR)

(73) Assignee: ABB Research Ltd, Zurich (CH)

( * ) Notice: Subject to any disclaimer, the term of this patent is extended or adjusted under 35 U.S.C. 154(b) by 0 days.

This patent is subject to a terminal disclaimer.

(21) Appl. No.: 11/797,486

(22) Filed: May 3, 2007

(65) Prior Publication Data

US 2007/0235293 A1 Oct. 11, 2007

Related U.S. Application Data

(63) Continuation of application No. PCT/CH2004/000701, filed on Nov. 22, 2004.

(51) Int. Cl.
*H02M 3/335* (2006.01)
*H02M 7/44* (2006.01)
*H02H 7/122* (2006.01)

(52) U.S. Cl. .................... 363/17; 363/56.03; 363/98; 363/132

(58) Field of Classification Search ................ 363/17, 363/43, 98, 132
See application file for complete search history.

(56) References Cited

U.S. PATENT DOCUMENTS

| | | | |
|---|---|---|---|
| 5,134,355 A | 7/1992 | Hastings | 323/211 |
| 5,179,289 A * | 1/1993 | Sridharan | 307/110 |
| 5,481,178 A | 1/1996 | Wilcox et al. | 323/287 |
| 5,552,695 A | 9/1996 | Schwartz | 323/271 |
| 5,568,044 A | 10/1996 | Bittner | 323/272 |

(Continued)

FOREIGN PATENT DOCUMENTS

DE 692 05 413 T2 6/1996

(Continued)

OTHER PUBLICATIONS

G.Gateau et al., "Stacked Multicell Converter (SMC): Topology and Control", EPE 2001-Graz, pp. 1-10.

(Continued)

*Primary Examiner*—Bao Q Vu
(74) *Attorney, Agent, or Firm*—Buchanan Ingersoll & Rooney PC (57) ABSTRACT

A converter circuit is disclosed for switching of a multiplicity of switching voltage levels, which have n first switching groups for each phase (R, S, T), with the n-th first switching group being formed by a first drivable bidirectional power semiconductor switch and a second drivable bidirectional power semiconductor switch, and with the first switching group to the (n−1)-th switching group each being formed by a first drivable bidirectional power semiconductor switch and a second drivable bidirectional power semiconductor switch, and by a capacitor which is connected to the first and second drivable bidirectional power semiconductor switches with each of the n first switching groups being connected in a linked form to the respectively adjacent first switching group, and with the first and the second drivable bidirectional power semiconductor switches in the first switching group being connected to one another.

20 Claims, 3 Drawing Sheets

U.S. PATENT DOCUMENTS

| | | | |
|---|---|---|---|
| 5,705,919 A | 1/1998 | Wilcox | 323/282 |
| 5,767,664 A | 6/1998 | Price | 323/907 |
| 5,912,552 A | 6/1999 | Tateishi | 323/285 |
| 5,940,285 A * | 8/1999 | Carrere et al. | 363/62 |
| 6,246,220 B1 | 6/2001 | Isham et al. | 323/224 |
| 6,528,976 B1 | 3/2003 | Lenk et al. | 323/282 |
| 6,798,677 B2 * | 9/2004 | Jakob et al. | 363/123 |
| 6,879,503 B2 * | 4/2005 | Meynard et al. | 363/71 |
| 7,030,587 B2 * | 4/2006 | Anwar et al. | 318/701 |

FOREIGN PATENT DOCUMENTS

| | | |
|---|---|---|
| JP | 11194842 | 7/1999 |
| WO | 93/02501 | 2/1993 |

OTHER PUBLICATIONS

PCT/ISA/210.
PCT/ISA/237.

* cited by examiner

CONVERTER CIRCUIT FOR SWITCHING OF A MULTIPLICITY OF SWITCHING VOLTAGE LEVELS

TECHNICAL FIELD

The invention relates to the field of power electronics, and relates in particular to a converter circuit for switching of a multiplicity of switching voltage levels, as claimed in the preamble of the independent claim.

PRIOR ART

Nowadays, a wide range of converter circuits are used for power-electronic applications. The requirements for a converter circuit such as this are in this case on the one hand to produce as few harmonics as possible in phases of an electrical AC power supply system which is normally connected to the converter circuit, and on the other hand to transmit power levels that are as high as possible with as small a number of electronic components as possible. One suitable converter circuit for switching of a multiplicity of switching voltage levels is specified in DE 692 05 413 T2. n first switching groups are provided for each phase in this document, with the n-th first switching group being formed by a first power semiconductor switch and a second power semiconductor switch, and the first first switching group to the (n−1)-th switching group each being formed by a first power semiconductor switch and a second power semiconductor switch, and by a capacitor which is connected to the first and second power semiconductor switches, where n ≧2. Each of the n first switching groups is connected in parallel to the respectively adjacent first switching group, with the first and the second power semiconductor switches in the first first switching group being connected to one another. The first and the second power semiconductor switches are each formed by a bipolar transistor with a drive electrode that is arranged in an insulated form (IGBT Insulated Gate Bipolar Transistor), and by a diode connected back-to-back in parallel with the bipolar transistor.

One problem with a converter circuit for switching of a multiplicity of switching voltage levels according to DE 692 05 413 T2 is that the electrical energy that is stored in the converter circuit during operation is very high. Since the electrical energy is stored in the capacitors in the n first switching groups of the converter circuit, the capacitors must be designed for this electrical energy, that is to say in terms of their withstand voltage and/or their capacitance. However, this results in physically large capacitors, which are correspondingly expensive. Furthermore, the converter circuit requires a large amount of space because the capacitors have a large physical size, so that a space-saving design, as is required for many applications, for example for traction applications, is impossible. Furthermore, the use of capacitors with a large physical size results in high assembly and maintenance costs.

DESCRIPTION OF THE INVENTION

The object of the invention is therefore to specify a converter circuit for switching of a multiplicity of switching voltage levels, which stores as little electrical energy as possible during its operation, and which can be produced in a space-saving manner. This object is achieved by the features of claim 1. Advantageous developments of the invention are specified in the dependent claims.

The converter circuit according to the invention for switching of a multiplicity of switching voltage levels has n first switching groups provided for each phase, with the n-th first switching group being formed by a first drivable bidirectional power semiconductor switch and a second drivable bidirectional power semiconductor switch, and with the first first switching group to the (n−1)-th switching group each being formed by a first drivable bidirectional power semiconductor switch and a second drivable bidirectional power semiconductor switch, and by a capacitor which is connected to the first and second drivable bidirectional power semiconductor switches with each of the n first switching groups, when a plurality of first switching groups are present, connected in a linked form to the respectively adjacent first switching group, and with the first and the second drivable bidirectional power semiconductor switches in the first first switching group being connected to one another.

According to the invention, m ≧1, and p second switching groups and p third switching groups are provided, which each have a first drivable bidirectional power semiconductor switch, a second drivable bidirectional power semiconductor and a capacitor, where p≧1. When there are a plurality of second switching groups, each of the second switching groups are connected in a linked form to the respectively adjacent third switching group. Furthermore, the first second and the first third switching group each have a third drivable bidirectional power semiconductor switch which is connected back-to-back in series with the respective second drivable bidirectional power semiconductor switch, with the first second switching group being connected to the first drivable bidirectional power semiconductor switch in the n-th first switching group, and with the first third switching group being connected to the second drivable bidirectional power semiconductor switch in the n-th first switching group. Furthermore, the capacitor in the p-th second switching group is connected in series with the capacitor in the p-th third switching group.

The p second switching groups and p third switching groups that are provided, as well as their connections as described above, mean, for example, that the p second switching groups are involved in the phase output AC voltage only in the positive half-cycle, and the p third switching groups are involved in the phase output AC voltage only during the negative half-cycle, during operation of the converter circuit according to the invention. This advantageously makes it possible to reduce the amount of electrical energy which is stored in the converter circuit, in particular in the capacitors in the p second and third switching groups. Furthermore, the n first switching groups are used only for balancing of the phase output AC voltage, so that, when a plurality of first switching groups are present, the capacitors in the n first switching groups essentially carry no current in the balanced state, and therefore also essentially do not store any electrical energy. This makes it possible to keep the total amount of electrical energy stored in the converter circuit low, so that the capacitors in the converter circuit need be designed only for a small amount of electrical energy to be stored, that is to say in terms of their withstand voltage and/or their capacitance. As a result of the small physical size of the capacitors, the converter circuit requires very little space, thus advantageously making possible a space-saving design, as is required for many applications, for example traction applications. Furthermore, the small physical size of the capacitors also advantageously makes it possible to keep the assembly and maintenance costs low.

These and further objects, advantages and features of the present invention will become clear from the following detailed description of preferred exemplary embodiments of the invention, in conjunction with the drawings.

The reference symbols used in the drawings and their meanings are listed in summarized form in the list of reference symbols. In principle, identical parts are provided with the same reference symbols in the figures. The described embodiments represent examples of the subject matter of the invention, and have no restrictive effect.

Approaches to Implementation of the Invention

Figure 1:
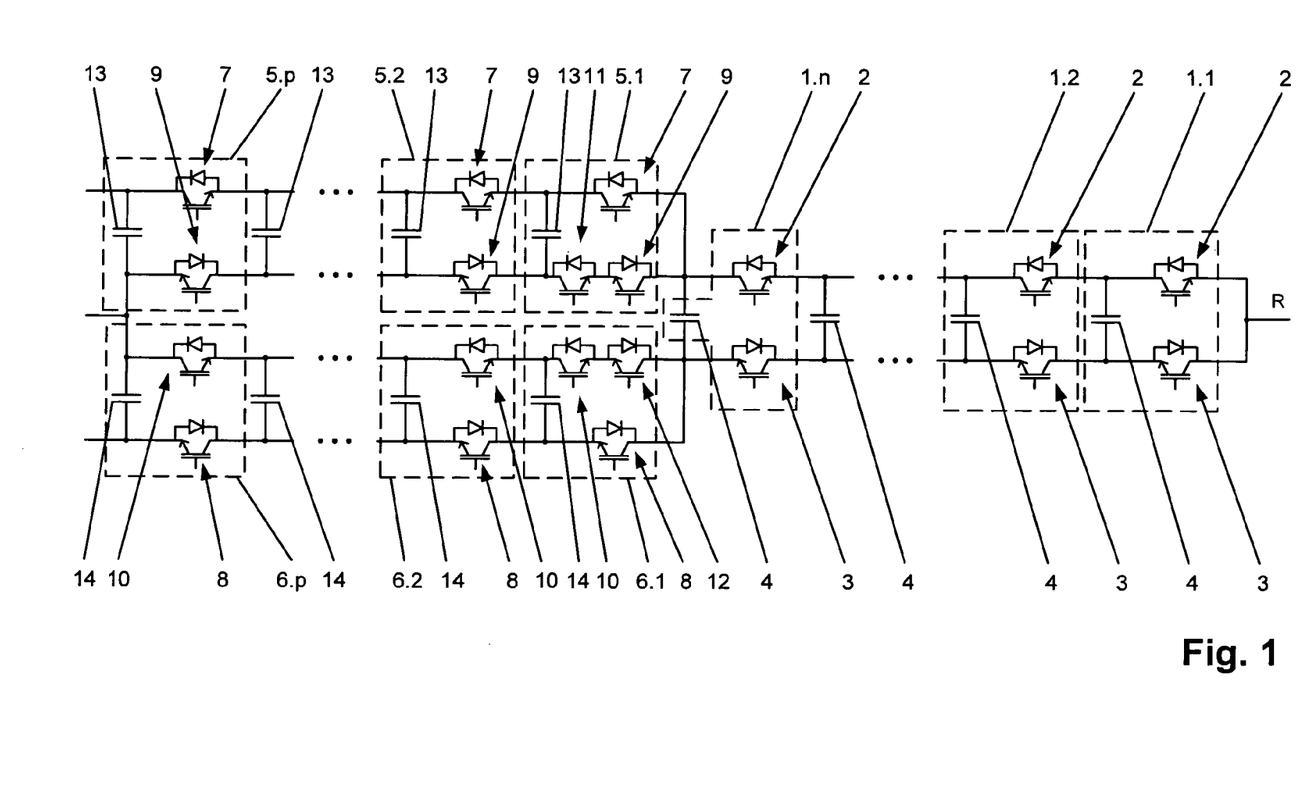
FIG. 1 shows a first embodiment of a converter circuit according to the invention.

FIG. 1 shows one embodiment, in particular a single-phase embodiment, of a converter circuit according to the invention for switching of a multiplicity of switching voltage levels. In this case, the converter circuit has n first switching groups 1.1, ..., 1.n which are provided for each phase R, Y, B, with the n-th first switching group 1.n being formed by a first drivable bidirectional power semiconductor switch 2 and a second drivable bidirectional power semiconductor switch 3, and with the first first switching group 1.1 to the (n−1)-th switching group (1.(n−1)) each being formed by a first drivable bidirectional power semiconductor switch 2 and a second drivable bidirectional power semiconductor switch 3, and by a capacitor 4 which is connected to the first and second drivable bidirectional power semiconductor switches 2, 3, in which case, according to the invention, n ≧ 1 and each of the n first switching groups 1.1, ..., 1.n is connected in a linked form to the respectively adjacent first switching group 1.1, ..., 1.n. As can be seen from FIG. 1, the first and the second drivable bidirectional power semiconductor switches 2, 3 in the first first switching group 1.1 are connected to one another. The junction point of the first and second power semiconductor switches 2, 3 in the first first switching group 1.1 forms a phase connection, in particular for the phase R, as shown in FIG. 1. According to the invention, p second switching groups 5.1, ..., 5.p and p third switching groups 6.1, ..., 6.p are now provided, and each have a first drivable bidirectional power semiconductor switch 7, 8, a second drivable bidirectional power semiconductor switch 9, 10 and a capacitor 13, 14, where p ≧ 1. Since, as shown in FIG. 1, both each of the p second switching groups 5.1, ..., 5.p and each of the p third switching groups 6.1, ..., 6.p represent a four-pole network, each of the p second switching groups 5.1, ..., 5.p are connected in a linked form, on the basis of the four-pole network theory, to the respectively adjacent second switching group 5.1, ..., 5.p. Furthermore, each of the p third switching groups 6.1, ..., 6.p is connected in a linked form, on the basis of the four-pole network theory, to the respectively adjacent third switching group 6.1, ..., 6.p. Furthermore, the first second and the first third switching group 5.1, 6.1 each have a third drivable bidirectional power semiconductor switch 11, 12, which is connected back-to-back in series with the respective second drivable bidirectional power semiconductor switch 9, 10, with the first second switching group 5.1 being connected to the first drivable bidirectional power semiconductor switch 2 in the n-th first switching group 1.n, and the first third switching group 6.1 being connected to the second drivable bidirectional power semiconductor switch 3 in the n-th first switching group 1.n. Finally, the capacitor 13 in the p-th second switching group 5.p is connected in series with the capacitor 14 in the p-th third switching group 6.p. The p second switching groups 5.1, ..., 5.p are, for example, involved in the phase output AC voltage only during the positive half cycle, and the p third switching group 6.1, ..., 6.p are involved in the phase output AC voltage only during the negative half-cycle, during operation of the converter circuit according to the invention, by means of the p second switching groups 5.1, ..., 5.p and p third switching group 6.1, ..., 6.p that are provided, and there describe connections to one another, between one another and to the n-th first switching group 1.n. This advantageously makes it possible to reduce the electrical energy that is stored in the converter circuit, in particular in the capacitors 13, 14 in the p second and third switching groups 5.1, ..., 5.p; 6.1, ..., 6.p. Furthermore, the n first switching groups 1.1, ..., 1.n are used only for balancing of the phase output AC voltage, so that the capacitors 4 in the n first switching groups 1.1, ..., 1.n essentially carry no current, and therefore also essentially store no electrical energy, when the phase output AC voltage is in the balanced state. This makes it possible to keep the total amount of stored electrical energy in the converter circuit according to the invention low, so that the capacitors 4, 13, 14 in the converter circuit need be designed only for a small amount of electrical energy to be stored, that is to say in terms of their withstand voltage and/or their capacitance. As a result of the small physical size of the capacitors 4, 13, 14, the converter circuit requires a minimum amount of space, thus advantageously allowing a space-saving design, as is required for many applications, for example for traction applications. Furthermore, the small physical size of the capacitors 4, 13, 14 also makes it advantageously possible to keep the assembly and maintenance costs low.

It should be mentioned that the back-to-back connection of the second and third drivable bidirectional power semiconductor switches 9, 10, 11, 12 in series should be understood as meaning that the second and third drivable bidirectional power semiconductor switches 9, 10, 11, 12 each have a controlled main current flow direction in opposite senses to one another.

As shown in FIG. 1, the n-th first switching unit 1.n has a capacitor 4 which is connected to the first and second drivable bidirectional power semiconductor switches 2, 3 in the n-th first switching group 1.n, with the first second switching group 5.1 being connected to the capacitor 4 in the n-th first switching group 1.n, and the first third switching group 6.1 being connected to the capacitor 4 in the n-th first switching group 1.n. The capacitor 4 in the n-th first switching group 1.n advantageously means that, particularly when the desired phase output voltage is 0V, this phase output voltage can be stabilized, and can thus be achieved without any problems, without interference effects. The capacitor 4 in the n-th first switching group 1.n is used only for voltage limiting and/or for voltage stabilization, and should therefore not be regarded as a voltage source.

As shown in FIG. 1, the first and second drivable bidirectional power semiconductor switches 7, 9 in the first second switching group 5.1 are connected to one another, with the junction point of the first and second drivable bidirectional power semiconductor switches 7, 9 in the first second switching group 5.1 being connected to the junction point of the capacitor 4 in the n-th first switching group 1.n and the first drivable bidirectional power semiconductor switch 2 in the n-th first switching group 1.n. Furthermore, the first and third drivable bidirectional power semiconductor switches 8, 12 in the first third switching group 6.1 are connected to one another, with the junction point of the first and third drivable bidirectional power semiconductor switches 8, 12 in the first third switching group 6.1 being connected to the junction point of the capacitor 4 in the n-th first switching group 1.n and the second drivable bidirectional power semiconductor switch 3 in the n-th first switching group 1.n.

As shown in FIG. 1, in the case of the first second switching group 5.1, the first and the third drivable bidirectional power semiconductor switches 7, 11 are connected to the capacitor 13 in the first second switching group 5.1. Furthermore, in the case of the first third switching group 6.1, the first and the second drivable bidirectional power semiconductor switches 8, 10 are connected to the capacitor 14 in the first third switching group 6.1. Furthermore, in the case of the second second to the p-th second switching group 5.2, ..., 5.p and in the case of the second third to the p-th third switching group 6.2, ..., 6.p, the first and the second drivable bidirectional power semiconductor switches 7, 9, 8, 10 are respectively connected to the capacitor 13, 14 in the associated switching group 5.2, ..., 5.p; 6.2, ..., 6.p.

It is feasible for the total number of the n first switching groups 1.1, ..., 1.n to correspond to the total number of p second and third switching groups 5.1, ..., 5.p; 6.1, ..., 6.p. In general, $(2n+1)$ switching voltage levels can therefore advantageously be switched by the converter circuit according to the invention.

Alternatively, it is also feasible for the total number of the n first switching groups 1.1, ..., 1.n to be less than the total number of p second and third switching groups 5.1, ..., 5.p; 6.1, ..., 6.p. This advantageously means that fewer first switching groups 1.1, ..., 1.n and thus fewer first and second power semiconductor switches 2, 3 and fewer capacitors 4 are required, and thus, overall, that the space required for the converter circuit according to the invention can be reduced further.

Furthermore, it is also feasible for the total number of the n first switching groups 1.1, ..., 1.n to be greater than the total number of p second and third switching groups 5.1, ..., 5.p; 6.1, ..., 6.p.

Figure 3:
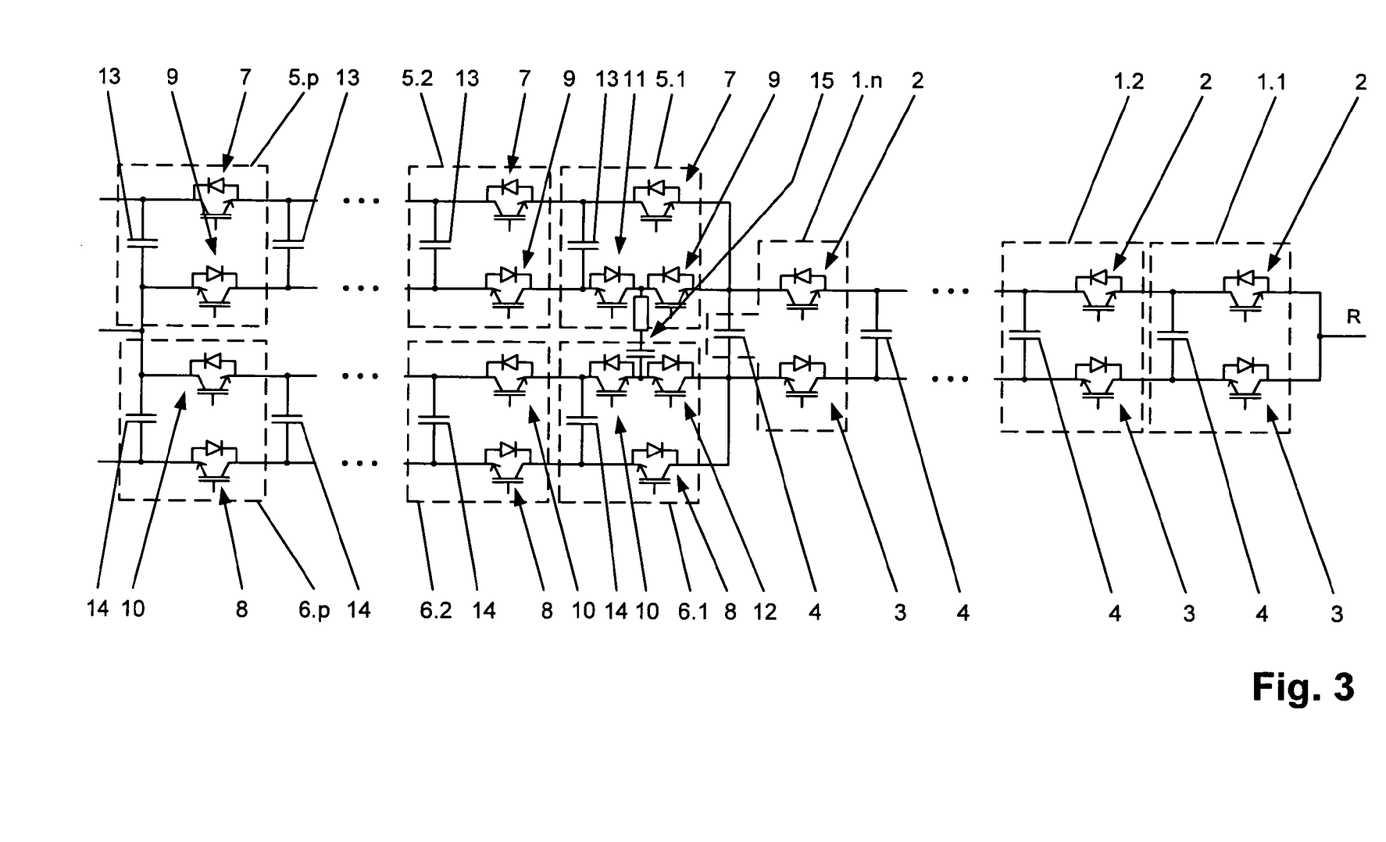
FIG. 3 shows a third embodiment of a converter circuit according to the invention.

In general, in the case of the converter circuit according to the invention, the respective first, second and third drivable bidirectional power semiconductor switches 2, 3, 7, 8, 9, 10, 11, 12 in the n first switching groups 1.1, ..., 1.n and the p second and third switching groups 5.1, ..., 5.p; 6.1, ..., 6.p are formed by a drivable power semiconductor component which carries current in one direction, for example by a bipolar transistor with a drive electrode arranged in insulated form (IGBT—Insulated Gate Bipolar Transistor), and by a passive non-drivable power semiconductor component, which is connected back-to-back in parallel with it and carries current in one direction, for example by a diode. As shown in FIG. 1, the first and second drivable bidirectional power semiconductor switches 2, 3, 7, 8, 9, 10 within the respective switching group 1.1, ..., 1.n; 5.1, ..., 5.p; 6.1, ..., 6.p are connected in such a manner that they have a controlled main current flow direction in opposite senses, that is to say that the drivable power semiconductor components in which current is carried in one direction each have a controlled main current flow direction in opposite senses to one another. Furthermore, in the case of the first second and in the case of the first third switching group 5.1, 6.1, as already mentioned, the third drivable bidirectional power semiconductor switches 11,12 are connected back-to-back in series with the respective second drivable bidirectional power semiconductor switches 9, 10, that is to say for example as shown in FIG. 1, the passive non-drivable power semiconductor components, which are in the form of diodes, in the second and third drivable bidirectional power semiconductor switches 9, 10, 11, 12 are connected to one another at their anodes, and the drivable power semiconductor components which are in the form of IGBTs are connected to one another by their emitters. However, it is also feasible for the respective second drivable bidirectional power semiconductor switches 9, 10 to be connected back-to-back in series with the third drivable bidirectional power semiconductor switches 11, 12, in such a manner that the passive non-drivable power semiconductor components, which are in the form of diodes, in the second and third drivable bidirectional power semiconductor switches 9, 10, 11, 12 are connected to one another at their cathodes, and the drivable power semiconductor components which are in the form of IGBTs are connected to one another by their collectors. This circuitry is illustrated in a third embodiment of the converter circuit according to the invention, as shown in FIG. 3, for the second and third drivable bidirectional power semiconductor switches 9, 11 in the first second switching group 5.1, and this third embodiment is described in detail in the following text. This circuitry is equivalent to exchanging space for the second and third drivable bidirectional power semiconductor switches 9, 10, 11, 12 within the respective switching group 5.1, 6.1 in the first embodiment as shown in FIG. 1, with the method of operation being identical to that of the back-to-back series circuit, as described above, of the second and third drivable bidirectional power semiconductor switches 9, 10, 11, 12.

It has advantageously been found that, in the case of the n first switching groups 1.1, ..., 1.n, the two first drivable bidirectional power semiconductor switches 2 in the respectively adjacent first switching groups 1.1, ..., 1.n are integrated in one module, that is to say, if there are a plurality of first switching groups 1.1, ..., 1.n, the first drivable bidirectional power semiconductor switch 2 in the n-th first switching group 1.n and the first drivable bidirectional power semiconductor switch 2 in the (n−1)-th first switching group 1.(n−1) are integrated in one module, and the first drivable bidirectional power semiconductor switch 2 in the (n−1)-th first switching group 1.(n−1) and the first drivable bidirectional power semiconductor switch 2 in the (n−2)-th first switching group 1.(n−2) are integrated in one module, etc. Furthermore, it has been found to be advantageous for the two second drivable bidirectional power semiconductor switches 3 in the respectively adjacent first switching groups 1.1, ..., 1.n to be integrated in one module, that is to say, when there are a plurality of first switching groups 1.1, ..., 1.n, for the second drivable bidirectional power semiconductor switch 3 in the n-th first switching group 1.n and the second drivable bidirectional power semiconductor switch 3 in the (n−1)-th first switching group 1.(n−1) to be integrated in one module, and for the second drivable bidirectional power semiconductor switch 3 in the (n−1)-th first switching group 1.(n−1) and the second drivable bidirectional power semiconductor switch 3 in the (n−2)-th first switching group 1.(n−2) to be integrated in one module, etc. The modules mentioned above are conventional standard half-bridge modules, and are accordingly of simple design, are highly reliable and are also available at low cost.

It is also feasible, when there are a plurality of first switching groups 1.1, ..., 1.n, for the first drivable bidirectional power semiconductor switch 2 and the second drivable bidirectional power semiconductor switch 3 in each of the n first switching groups 1.1, ..., 1.n to be integrated in one module. As already mentioned, modules such as these are normally standard half-bridge modules, and are accordingly of simple design, are highly reliable and, furthermore, are available at low cost.

Furthermore, it has been found to be advantageous that, if there are a plurality of second switching groups 5.1, . . . , 5.p in the p second switching group 5.1 . . . , 5.p, for the two first drivable bidirectional power semiconductor switches 7 in the respectively adjacent second switching groups 5.1, . . . , 5.p to be integrated in one module, that is to say in the manner described above in detail for the n first switching groups 5.1, . . . , 5.p. Furthermore, when there are a plurality of third switching groups 6.1, . . . , 6.p in the p third switching groups 6.1, . . . , 6.p, the two first drivable bidirectional power semiconductor switches 8 in the respectively adjacent third switching groups 6.1, . . . , 6.p are integrated in one module, that is to say in the manner described in detail above for the n first switching groups 1.1, . . . , 1.n.

As an alternative to this, it is also possible, when there are a plurality of second and third switching groups 5.1, . . . , 5.p; 6.1, . . . , 6.p in the p second and third switching groups 5.1, . . . , 5.p; 6.1, . . . , 6.p, for the first drivable bidirectional power semiconductor switches 7, 8 and the second drivable bidirectional power semiconductor switches 9, 10 to each be integrated in one module. The modules mentioned above are normally standard modules, and accordingly of simple design, are highly reliable and, furthermore, are available at low cost.

Furthermore, it is feasible for the third drivable bidirectional power semiconductor switch 11 in the first second switching group 5.1 and the third drivable bidirectional power semiconductor switch 12 in the first third switching group 6.1 to be integrated in one module. Once again, these are standard modules with the corresponding advantages that have already been mentioned.

In the case of a converter circuit that needs to be implemented according to the invention with a plurality of phases, the p-th second switching groups 5.p of the phases R, Y, B are preferably connected to one another in parallel, and the p-th third switching groups 6.p of the phases R, Y, B are connected to one another in parallel. The respective connections are made at the capacitors 13 in the respective p-th second switching groups 5,p and at the capacitors 14 in the respective p-th third switching groups 6.p.

In order to advantageously make it possible to save space in a converter circuit that has a plurality of phases, the capacitors 13 in the p-th second switching groups 5.p of the phases R, Y, B are preferably combined to form one capacitor. Furthermore, the capacitors 14 in the p-th third switching groups 6.p of the phases R, Y, B are preferably likewise combined to form one capacitor.

Figure 2:
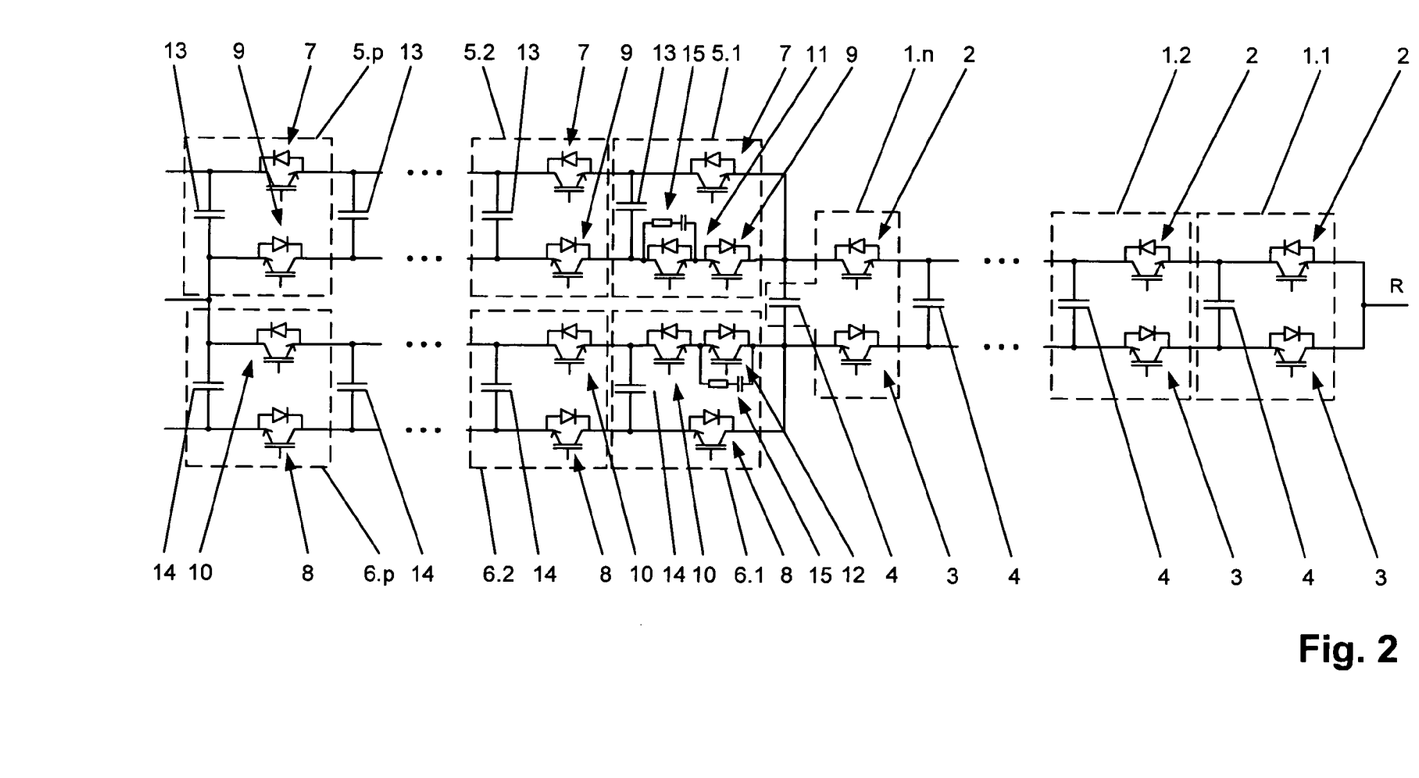
FIG. 2 shows a second embodiment of a converter circuit according to the invention.

FIG. 2 shows a second embodiment of the converter circuit according to the invention, which differs from the first embodiment shown in FIG. 1 in that a voltage limiting network 15 is connected in parallel with the third drivable bidirectional power semiconductor switch 11 in the first second switching group 5.1, and a voltage limiting network 15 is likewise connected in parallel with the third drivable bidirectional power semiconductor switch 12 in the first third switching group 6.1. The voltage limiting network 15 can be chosen optionally and is advantageously used for stabilization of the phase output voltage, particularly for a desired phase output voltage of 0V. The voltage limiting network 15 preferably has a capacitor or, as is shown in FIG. 2, a series circuit of a resistor with a capacitor.

As an alternative to the second embodiment shown in FIG. 2, FIG. 3 shows a third embodiment of the converter circuit according to the invention. The third embodiment shown in FIG. 3 differs from the second embodiment shown in FIG. 2 in that a voltage limiting network 15 is connected to the junction point of the second and third drivable power semiconductor switches 9, 11 in the first second switching group 5.1, and to the junction point of the second and third drivable power semiconductor switches 10, 12 in the first third switching group 6.1. The voltage limiting network 15 can be chosen optionally and is advantageously used for stabilization of the phase output voltage, particularly for a desired phase output voltage of 0V. The voltage limiting network 15 preferably has a capacitor or, as is shown in FIG. 3, a series circuit of a resistor with a capacitor.

Overall, the converter circuit according to the invention for switching of a multiplicity of switching voltage levels therefore represents a solution which is characterized by a small amount of stored electrical energy during its operation and by a space-saving design, and which is therefore an uncomplicated, robust and highly reliable solution.

LIST OF REFERENCE SYMBOLS

1.1, . . . , 1.n First switching groups
2 First drivable bidirectional power semiconductor switch in the first switching groups
3 Second drivable bidirectional power semiconductor switch in the first switching groups
4 Capacitor in the first switching groups
5.1, . . . , 5.p Second switching groups
6.1, . . . , 6.p Third switching groups
7 First drivable bidirectional power semiconductor switch in the second switching groups
8 First drivable bidirectional power semiconductor switch in the third switching groups
9 Second drivable bidirectional power semiconductor switch in the second switching groups
10 Second drivable bidirectional power semiconductor switch in the third switching groups
11 Third drivable bidirectional power semiconductor switch in the second switching groups
12 Third drivable bidirectional power semiconductor switch in the third switching groups
13 Capacitor in the second switching groups
14 Capacitor in the third switching groups
15 Voltage limiting network

The invention claimed is:

1. A converter circuit for switching of a multiplicity of switching voltage levels, having n first switching groups (1.1, . . . , 1.n) provided for each phase (R, Y, B), with the n-th first switching group (1.n) being formed by a first drivable bidirectional power semiconductor switch and a second drivable bidirectional power semiconductor switch, and with the first first switching group (1.1) to the (n−1)-th switching group (1.(n−1)) each being formed by a first drivable bidirectional power semiconductor switch and a second drivable bidirectional power semiconductor switch, and by a capacitor which is connected to the first and second drivable bidirectional power semiconductor switches (2, 3) with each of the n first switching groups (1.1, . . . , 1.n) being connected in a linked form to the respectively adjacent first switching group (1.1, . . . , 1.n), and with the first and the second drivable bidirectional power semiconductor switches (2, 3) in the first first switching group (1.1) being connected to one another, wherein n≧1, and p second switching groups (5.1, . . . , 5.p) and p third switching groups (6.1, . . . , 6.p) are provided, which each have a first drivable bidirectional power semiconductor switch, a second drivable bidirectional power semiconductor switch and a capacitor, with p≧1 and each of the p second switching groups (5.1, ..., 5.p) being connected in a linked form to the respectively adjacent second switching group (5.1, ..., 5.p), and with each of the p third switching groups (6.1, ..., 6.p) being connected in a linked form to the respectively adjacent third switching group (6.1, ..., 6.p), in that the first second and the first third switching group (5.1, 6.1) each have a third drivable bidirectional power semiconductor switch which is connected back-to-back in series with the respective second drivable bidirectional power semiconductor switch, with the first second switching group (5.1) being connected to the first drivable bidirectional power semiconductor switch in the n-th first switching group (1.n), and with the first third switching group (6.1) being connected to the second drivable bidirectional power semiconductor switch in the n-th first switching group (1.n), and in that the capacitor in the p-th second switching group (5.p) is connected in series with the capacitor in the p-th third switching group (6.p).

2. The converter circuit as claimed in claim 1, wherein the n-th first switching group (1.n) has a capacitor which is connected to the first and second drivable bidirectional power semiconductor switches (2, 3) in the n-th first switching group (1.n), with the first second switching group (5.1) being connected to the capacitor in the n-th first switching group (1.n), and with the first third switching group (6.1) being connected to the capacitor in the n-th first switching group (1.n).

3. The converter circuit as claimed in claim 2, wherein the first and second drivable bidirectional power semiconductor switches in the first second switching group (5.1) are connected to one another, with the junction point of the first and second drivable bidirectional power semiconductor switches in the first second switching group being connected to the junction point of the capacitor in the n-th first switching group (1.n) and the first drivable bidirectional power semiconductor switch in the n-th first switching group (1.n), and in that the first and third drivable bidirectional power semiconductor switches in the first third switching group are connected to one another, with the junction point of the first and third drivable bidirectional power semiconductor switches in the first third switching group being connected to the junction point of the capacitor in the n-th first switching group (1.n) and the second drivable bidirectional power semiconductor switch in the n-th first switching group (1.n).

4. The converter circuit as claimed in claim 1, wherein in the first second switching group (5.1) the first and the third drivable bidirectional power semiconductor switches are connected to the capacitor in the first second switching group (5.1), and in that, in the first third switching group (6.1), the first and the second drivable bidirectional power semiconductor switches are connected to the capacitor in the first third switching group (6.1).

5. The converter circuit as claimed in claim 1, wherein in the second second to the p-th second switching group (5.2, ..., 5.p) and in the second third to the p-th third switching group (6.2, ..., 6.p), the first and the second drivable bidirectional power semiconductor switches are respectively connected to the capacitor in the associated switching group (5.2, ..., 5.p; 6.2, ..., 6.p).

6. The converter circuit as claimed in claim 1, wherein a voltage limiting network is connected in parallel with the third drivable bidirectional power semiconductor switch in the first second switching group (5.1), and in that a voltage limiting network is connected in parallel with the third drivable bidirectional power semiconductor switch in the first third switching group (6.1).

7. The converter circuit as claimed in claim 1, wherein a voltage limiting network is connected to the junction point of the second and third drivable power semiconductor switches in the first second switching group and to the junction point of the second and third drivable power semiconductor switches in the first third switching group.

8. The converter circuit as claimed in claim 6, wherein the voltage limiting network has a capacitor.

9. The converter circuit as claimed in claim 6, wherein the voltage limiting network has a series circuit of a resistor with a capacitor.

10. The converter circuit as claimed in claim 1, wherein the total number of the n first switching groups (1.1, ..., 1.n) corresponds to the total number of p second and third switching groups (5.1, ..., 5.p; 6.1, ..., 6.p).

11. The converter circuit as claimed in claim 1, wherein the total number of the n first switching groups (1.1, ..., 1.n) is less than the total number of p second and third switching groups (5.1, ..., 5.p; 6.1, ..., 6.p).

12. The converter circuit as claimed in claim 1, wherein the total number of the n first switching groups (1.1, ..., 1.n) is greater than the total number of p second and third switching groups (5.1, ..., 5.p; 6.1, ..., 6.p).

13. The converter circuit as claimed in claim 1, wherein the respective first, second and third drivable bidirectional power semiconductor switches are formed by a drivable power semiconductor component which carries current in one direction, and by a passive non-drivable power semiconductor component, which is connected back-to-back in parallel with it and carries current in one direction.

14. The converter circuit as claimed in claim 1, wherein in the n first switching groups (1.1, ..., 1.n), the two first drivable bidirectional power semiconductor switches in the respectively adjacent first switching groups (1.1, ..., 1.n) are integrated in one module, and the two second drivable bidirectional power semiconductor switches in the respectively adjacent first switching groups (1.1, ..., 1.n) are integrated in one module.

15. The converter circuit as claimed in claim 1, wherein in the n first switching groups (1.1, ..., 1.n), the first drivable bidirectional power semiconductor switch and the second drivable bidirectional power semiconductor switch are each integrated in one module.

16. The converter circuit as claimed in claim 1, wherein in the p second switching groups (5.1, ..., 5.p), the two first drivable bidirectional power semiconductor switches in the respectively adjacent second switching groups (5.1, ..., 5.p) are integrated in one module, and in that, in the p third switching groups (6.1, ..., 6.p) the two first drivable bidirectional power semiconductor switches in the respectively adjacent third switching groups (6.1, ..., 6.p) are integrated in one module.

17. The converter circuit as claimed in claim 1, wherein in the p second and third switching groups (5.1, ..., 5.p; 6.1, ..., 6.p) the first drivable bidirectional power semiconductor switches and the second drivable bidirectional power semiconductor switches are each integrated in one module.

18. The converter circuit as claimed in claim 1, wherein the third drivable bidirectional power semiconductor switch in the first second switching group (5.1), and the third drivable bidirectional power semiconductor switch in the first third switching group (6.1) are integrated in one module.

19. The converter circuit as claimed in claim 1, wherein when there are a plurality of phases (R, Y, B), the p-th second switching groups (5.p) of the phases (R, Y, B) are connected to one another in parallel, and the p-th third switching groups (6.p) of the phases (R, Y, B) are connected to one another in parallel.

20. The converter circuit as claimed in claim 19, wherein the capacitors in the p-th second switching groups (5.p) of the phases (R, Y, B) are combined to form one capacitor, and in that the capacitors in the p-th third switching groups (6.p) of the phases (R, Y, B) are combined to form one capacitor.

\* \* \* \* \*